3,175,294
INDUCTIVE DEVICE FOR DIVIDING A CIRCLE INTO A DETERMINED NUMBER OF EQUAL PARTS
Valery Lvovich Gabinov, 2nd Tverskaya-Yamskaya ul. 6, Apt. 25; Gueorgy Matveevich Brodsky, Leninsky Prospect 37a, Apt. 33; Jury Vasilievich Khokhlov, Taganskaya ul. 9, Apt. 12; and Serguey Sergueevich Podlazov, Gorodok Mossovieta, 2nd proyezd 2, Apt. 35, all of Moscow, U.S.S.R.
Filed Oct. 9, 1961, Ser. No. 143,978
6 Claims. (Cl. 33—1)

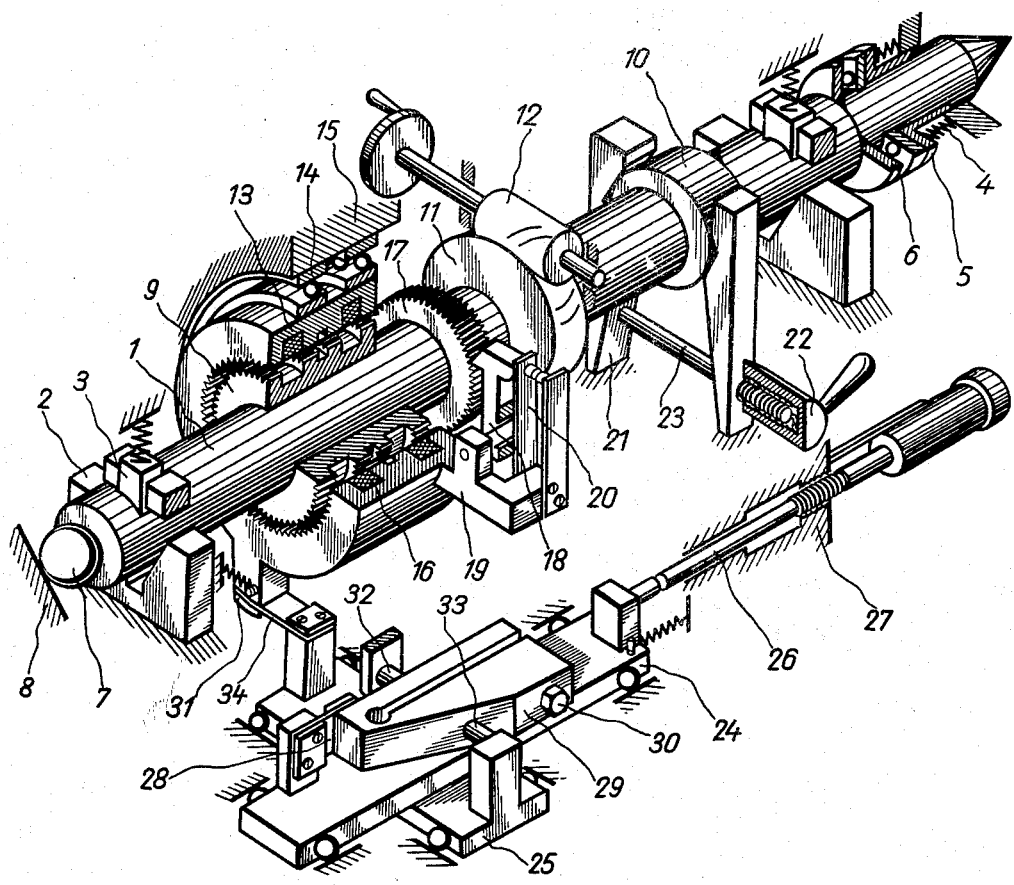

The present invention relates to inductive devices for dividing a circle into a determined number of equal parts and its purpose is to make an indexing device of higher accuracy as compared to the commonly used dividing or indexing attachments.

The device can be used for particularly precise indexing operations, for angular measurements of precision angular dials, verniers, indexing disks, gear wheels, splined shafts, gauges, etc.

The said attachment can be used either as an indexing head or an indexing table, i.e. with the rotor spindle either in the horizontal or vertical position.

Inductive dividing or indexing attachments with a rotor having two groups of teeth made of magnetically non-retentive material and a stator also with two groups of teeth made of magnetically non-retentive material, but with one group displaced angularly a half pitch with respect to the other group, and carrying two inductive coils connected in a bridge circuit and forming, together with the teeth, the rotor index movement inductive pick-up, have heretofore been known and utilized.

Such an attachment, however does not provide sufficient accuracy when compared to that obtained with optical indexing devices because no means are provided for indexing within the pick-up pitch interval.

To increase accuracy of division and to bring it to the level obtained with optical instruments, the stator of the said indexing attachment, according to the present invention, is operatively connected by means of, for example, a flexible band with a carriage actuated by a wedge-shaped cam driven by a micrometer head to adjust the angular position of the stator. This is the first feature of the invention.

The second feature of the present invention is that the cam is partially or fully split to make it possible to adjust the cam angle when correcting for linear errors in the kinematic circuits of the said attachment.

The third feature of the invention is that the rotor spindle carries a gear wheel which engages a ratchet pivoted on the frame and controlling contact separation in the circuit of a metering instrument connected in a bridge circuit.

Other aims and advantages of the present invention will appear in the following description and accompanying drawing.

The drawing shows the kinematic circuit of the device as it appears in the present invention.

To reduce radial beat and, hence, to obtain higher accuracy, spindle 1 rotates in two bearings mounted in the attachment housing and consisting of two lower V-blocks 2 with an angle of 90° and two upper slide blocks 3 provided with springs for holding the spindle 1 in engagement with the blocks 2.

The spindle is retained in the axial direction by means of three springs 4 which through flange 5 and thrust bearing 6 urge spherical bearing 7 on spindle 1 against anvil 8 mounted in the housing, which structure practically eliminates axial beat.

The following parts are rigidly fixed on the spindle:
rotor 9, brake drum 10 and worm gear 11 driven by worm 12. The pick-up stator 13 rotates in two bearings 14 mounted in bracket 15 fixed to the housing.

Stator 13 and rotor 9 made of magnetically non-retentive material are each provided with the same number of teeth, for example, 360 divided into two groups; these teeth in combination with induction coils 16 form two self-contained inductive systems. The gap between the teeth of the pick-up stator 13 and rotor 9 is approximately 0.05 mm., this distance being exaggerated in the drawing. The stator teeth in one group are displaced with respect to those in the other group by approximately half the pitch of the teeth.

When voltage is fed to coils 16, the current flowing through them will vary depending on the mutual relationship of the teeth of stator 13 and rotor 9. The currents in the coils will be equal when both groups of the half-pitch displaced stator teeth are equally overlapped by the rotor teeth. When this position is but slightly changed, i.e. when the stator teeth are displaced with respect to the rotor teeth, the current will increase in one of the coils and decrease in the other. Since both the stator and the rotor carry 360 teeth each, such a position will be repeated every $\frac{1}{720}$ of a turn, i.e. at approximately every 0.5 degree turn of the spindle.

By using a bridge circuit it is possible to compare the current in both coils, a microammeter connected in the bridge diagonal showing zero at every half-degree turn of the spindle. The microammeter, however will read zero also at every $\frac{1}{360}$ turn, i.e. every one degree turn of the spindle. Since required accuracy is obtained when the rotor is turned by one tooth pitch or the spindle is turned through one degree, a special device is provided in the indexing attachment which automatically opens the microammeter circuit each time the spindle is turned through 0.5 degree. This device comprises gear 17 fixed on spindle 1, ratchet 18 pivoted on bracket 19 and engaging the gear 17, and spring 20 having a contact mounted thereon for engaging a fixed contact.

Since gear 17 is provided with 360 teeth, the moment the spindle turns through 0.5 degree the ratchet 18 falls into the clearance between the gear teeth on gear 17, the spring moves the contact thereon out of engagement with the fixed contact and the microammeter circuit opens.

The spindle 1 is stopped in the required position by means of a gapless brake mechanisms consisting of two levers 21 held in engagement with the brake drum 10 by nut 22 threadedly received on bar 23.

In order to divide into fractions of a degree, a micrometer mechanism is provided with movable carriages 24 and 25 travelling in mutually perpendicular directions and mounted on the attachment housing. Carriage 24 is moved by means of micrometer screw 26 threadedly received in adjustable nut 27.

A split wedge-type cam 29 having a flat surface on one side and an inclined cam surface on the opposite side the angle of which can be adjusted by means of a bolt 30, is suspended by a flat spring 28 on carriage 24. A steel band 34 is fixed to carriage 25 connecting the latter with stator 13, and the carriage is urged in one direction by a spring 31. The flat surface of the cam 29 slidably engages an abutment 32 fixed to the housing of the apparatus, and a cam follower 33 fixed on the carriage 25 is yieldably urged into engagement with the inclined cam surface on the cam 29 by spring 31. When the micrometer screw 26 is turned, the carriage 24 and cam 29 move, thereby causing movement of the cam follower 33 and carriage 25. Since the carriage 25 is connected with stator 13 through band 34, the unloaded stator 13 mounted in bearings 14 will easily rotate.

In order to divide into fractions of a degree the procedure is as follows: Rotate micrometer screw 26 to turn stator 13 through the required angle; in this case the microammeter pointer, set at zero (which corresponds to an integer number of degrees), will deflect as the currents will become unequal due to displacement of the stator teeth in respect to the rotor teeth. After that turn spindle 1 and rotor 9 in the same direction till the microammeter pointer resets to zero, i.e., till the rotor teeth coincide with the stator teeth. In this case the spindle and the rotor will turn through the same angle as that through which the stator has turned, i.e. the circle will be divided into fractions of a degree.

What we claim is:

1. An apparatus for dividing a circle into a desired number of equal parts, said apparatus comprising a housing, a spindle rotatably mounted in said housing, a rotor of magnetically non-retentive material fixed to said rotor, two axially spaced groups of peripheral teeth on said rotor, a stator surrounding said rotor and rotatably mounted in said housing, two axially spaced groups of teeth on the inner surface of said stator disposed opposite the teeth on said rotor and radially spaced therefrom, one group of teeth on said stator being angularly displaced a distance of one-half tooth pitch with respect to the other group of teeth on said stator, an induction coil mounted in said stator for each group of stator teeth for providing a magnetic flux in the space between said stator and rotor, a slide mounted in said housing for movement at right angles to the axis of said stator, means connecting said slide and said stator, a cam follower on said slide, spring means for rotating said stator and moving said slide in one direction, means for moving said slide and rotating said stator in the opposite direction against the action of said spring means comprising a carriage mounted in said housing for movement parallel to the axis of said stator, a wedge-shaped cam mounted on said carriage and having an inclined cam surface engaging said follower and a micrometer screw threadedly mounted in said housing and engaging said carriage, whereby operation of said micrometer screw will move said carriage and said slide to rotate said stator for dividing a circle into parts of less than one-half of the pitch of said teeth.

2. An apparatus as defined in claim 1, in which said cam is pivotally mounted on said carriage, said cam having a straight surface on the side opposite said inclined cam surface and an abutment on said housing slidably engaging said straight surface to maintain said cam surface in engagement with said follower.

3. An apparatus as defined in claim 2, in which said cam is split longitudinally for a portion of the length thereof to provide a resilient structure and divide said cam into two relatively movable portions and means for moving one portion relative to the other portion to vary the inclination of said inclined cam surface.

4. An apparatus as defined in claim 1, in which spring means is provided for maintaining said carriage in engagement with said micrometer screw.

5. An apparatus as defined in claim 1, in which a gear is fixed to said spindle, a pivotally mounted pawl engaging said gear and electrical contacts actuated by said pawl.

6. An apparatus as defined in claim 1, in which a brake is provided on said spindle.

References Cited by the Examiner
UNITED STATES PATENTS

| | | | |
|---|---|---|---|
| 1,006,924 | 10/11 | Erb | 33—172 |
| 2,329,828 | 9/43 | Clark | 73—1 |

FOREIGN PATENTS

| | | |
|---|---|---|
| 127,553 | 5/59 | Russia. |

ISAAC LISANN, *Primary Examiner.*
CLIFFORD PRICE, *Examiner.*